Feb. 11, 1969  R. G. QUINN  3,427,216
BUILDING MATERIAL LAMINATE
Filed Feb. 24, 1965
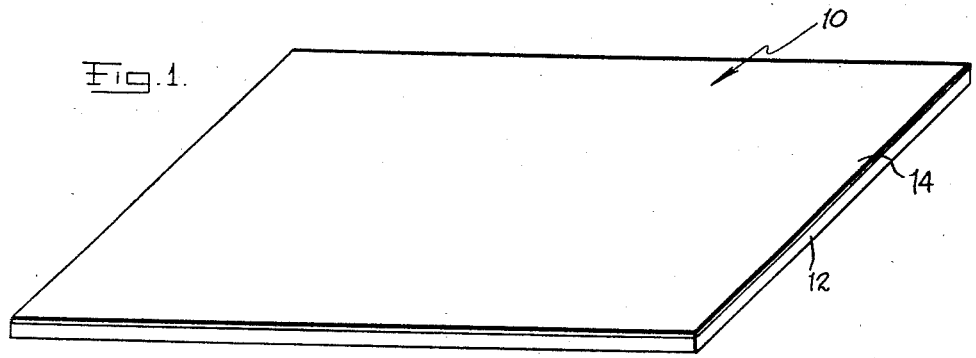
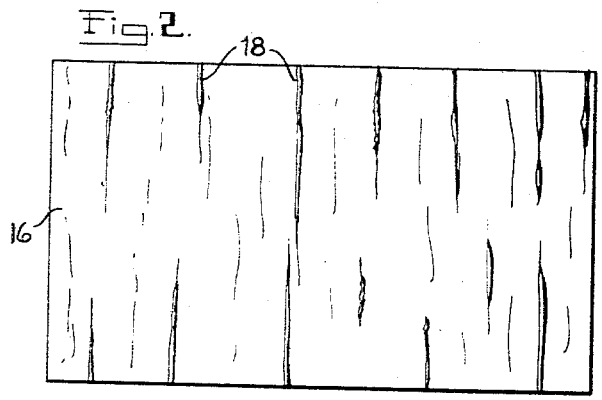
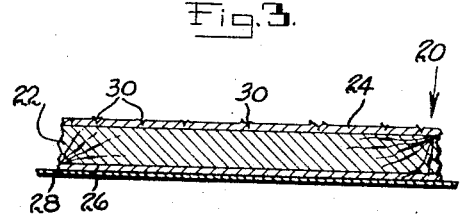
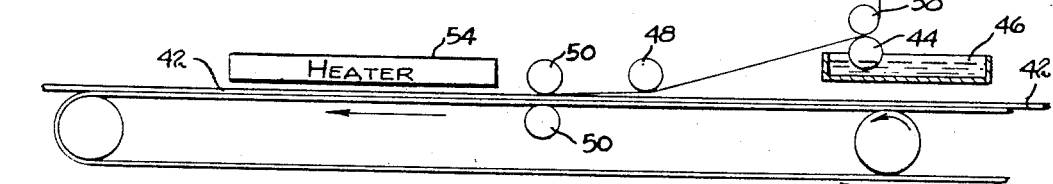
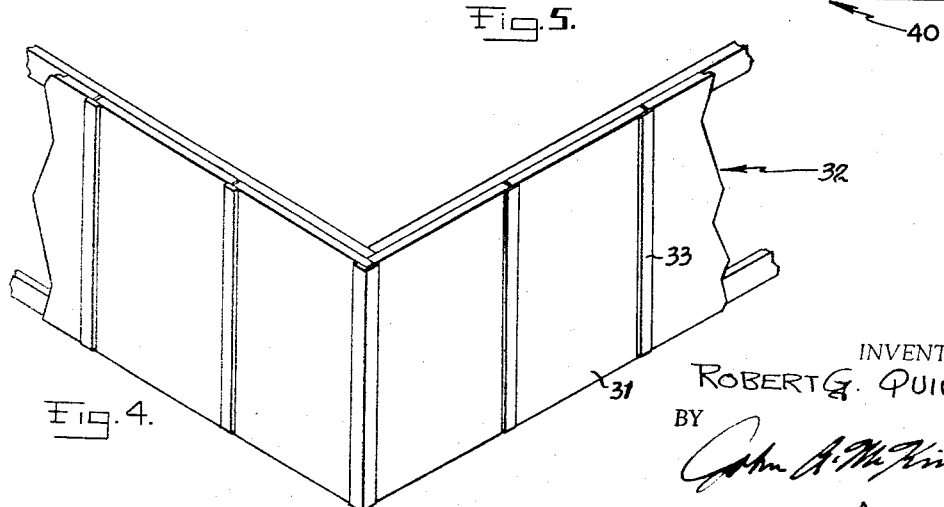
INVENTOR.
ROBERT G. QUINN
BY
*John A. McKinney*
ATTORNEY United States Patent Office 3,427,216
Patented Feb. 11, 1969

3,427,216
BUILDING MATERIAL LAMINATE
Robert Gerard Quinn, Bound Brook, N.J., assignor to Johns-Manville Corporation, New York, N.Y., a corporation of New York
Filed Feb. 24, 1965, Ser. No. 435,002
U.S. Cl. 161—205    12 Claims
Int. Cl. B32b 19/04, 19/08

ABSTRACT OF THE DISCLOSURE

A building material laminate with good weathering and fire resistance characteristics is comprised of a cellulosic sheet and asbestos paper.

---

This invention relates to a building material laminate, and more particularly, to a laminate comprising a thin layer of material laminated to the weather surface of a cellulosic sheet.

Plywood has long been recognized as a building material capable of a great many uses. When exposed to the weather, however, the plywood veneer tends to crack, thereby preventing the use of plywood alone in exterior installations. In the manufacture of plywood, some veneer layers unavoidably are of inferior quality, containing knots, rough surfaces, minor cracks, etc. While such plywood sheets can be used in certain installations where the surface is not exposed, such as for sheathing in the construction of a building wall, these sheets cannot ordinarily command as high a price as the superior quality plywood sheets.

Attempts have been made to cover the exterior veneer of plywood sheets with a layer or coating of a different material in order to improve the surface appearance and to improve the weathering characteristics of the panel. Plywood has been laminated to kraft paper impregnated with a suitable waterproofing material for increasing the weathering properties of the board. This arrangement is not entirely satisfactory, however, since the kraft fibers expand when wet and shrink when dried, and the sheet of plywood tends to warp when the fiber shrinkage occurs. Moreover, such an arrangement does not provide any fire resistance, and in addition, is relatively expensive due to the large amounts of waterproofing material impregnating the kraft paper.

Plastic films have also been laminated to plywood sheets to improve the appearance of the sheets and to increase their weathering characteristics. Major disadvantages of this type of arrangement, however, are the lack of fire resistance and the high cost involved as compared to a plain plywood sheet.

If it were possible to laminate an inexpensive material to the exterior surface of a plywood sheet to provide the sheet with good weathering and fire resistance characteristics, the laminate could be used as an exterior panel. Further, if such a material could conceal the defects of plywood veneers of inferior quality, plywood sheets of this type could be used in the laminate. Such panels could be used, for example, as the exterior panels in vacation homes or inexpensive cabins, and the thin layer of material could be painted or otherwise decorated to permit use of the panels as the exterior siding for more expensive buildings. Other uses to which such a panel could be put include concrete form boards and roofing materials.

In addition to plywood, board lumber or other cellulosic sheet material laminated to an economical overlay material which improves the resistance of the board to weathering and fire and also conceals any surface defects of the board would be highly effective and desirable. Such a laminate would find use in the same general areas mentioned in connection with plywood.

It is an object of the present invention to provide a cellulosic sheet with an overlay of material which hides the surface of the sheet and increases the resistance of the sheet to weathering.

Another object of this invention is to provide a laminate of a cellulosic sheet and overlay material, which laminate is more resistant to fire than the sheet alone.

A further object of the invention is to provide a laminate of wood and a thin overlay material which is simple and economical to manufacture, can readily be painted, and which provides adequate resistance to weathering and fire.

Another object is to provide an overlay of material for a sheet of wood, which overlay will not cause the wood to warp.

Another object is to provide a plywood sheet with an overlay material that does not reveal the outline of any rough portions or other defects in the surface of the sheet.

The objects of this invention are satisfied by the present invention which, briefly stated, comprises a laminate of a cellulosic board and asbestos paper wherein the asbestos paper, without additional treatment of the board will cause the board to have greatly increased resistance to weathering and fire.

The nature of the invention will be more fully understood and other objects may become apparent when the following detailed description is considered in connection with the accompanying drawing, wherein:

FIG. 1 is a pictorial representation of the laminate of the present invention;

FIG. 2 is a plan view of the face of a plywood panel which has been exposed to weathering and which was not covered with an overlay;

FIG. 3 is an enlarged partial transverse sectional view of a laminate of plywood and asbestos paper which has been exposed to weathering, showing the difference in appearance between an uncovered surface of plywood and a surface covered with asbestos paper;

FIG. 4 is a partial pictorial representation of a construction incorporating plywood panels faced with asbestos paper; and FIG. 5 is a diagrammatic representation of one means of laminating the asbestos paper to the plywood.

As indicated previously, a major obstacle to the use of plywood in exterior installations is its poor weatherability. Moisture enters the plywood veneer, causing the wood to swell, and subsequently, with changes in temperature and humidity, movement of the wood takes place. In addition, more violent wood movement is caused by freezing and subsequent melting of water inside the veneer layer. The veneer tends to crack along the grain or lines of weakness as a result of such wood movement. Merely providing a fluid waterproof coating on the exterior surface of the plywood is not sufficient to increase its weathering characteristics to a point where the plywood would be acceptable for exterior use, as such waterproof coatings would have to be reapplied repeatedly and would increase the cost of the board inordinately. Moreover, such coatings do not conceal the grain of the wood, and thus plywood sheets having exterior veneer layers of inferior quality, that is, veneer layers in which knots, rough portions and other unacceptable conditions are present could not be made to appear smooth.

The present invention employs asbestos paper as the overlay material to be laminated to the exterior veneer of a plywood sheet. Since the asbestos fibers in the paper do not swell and shrink upon being wetted and dried as do the cellulosic fibers of kraft paper, the laminate does not tend to warp as in the case of laminates formed of plywood and kraft paper. While the invention is described mainly with respect to a laminate comprising a plywood sheet, it should be understood that other cellulosic materials could be used as the base material of the laminate.

The asbestos paper employed in the present invention, in addition to increasing the weather resistance and fire resistance of wood or other cellulosic materials, should also meet other requirements in order to be commercially acceptable as a wood covering material. If the paper is too heavy, it becomes relatively costly, a situation which is to be avoided if the laminate is to fulfill the need for an inexpensive exterior material. The paper must be of such weight, however, as to permit ready manufacture on a paper making machine. It should have adequate wet strength to withstand the effects of the moisture to which it would be exposed in an exterior installation, and it should not be too porous or it will absorb too much paint. In like manner, if too porous it will absorb too much of the adhesive used to adhere it to the plywood sheet. The paper preferably should also have adequate resistance to abrasion.

It has been found that all of the foregoing desirable features are met by an asbestos paper which weighs at least about four pounds per hundred square feet and has a porosity such that 100 cc. of air takes at least 200 seconds, as measured by the Gurley densometer, a testing apparatus constructed by the W. & L. E. Gurley Company, in accordance with the instrument and test procedure described in TAPPI Test T–460 M49, to pass through the thickness of the paper. A paper of this weight can be manufactured on standard paper making equipment, yet is a relatively inexpensive material for use as an overlay. By having a porosity of this order, adhesive and paint are absorbed in relatively small amounts only, making it economical to apply to a cellulosic base and subsequently to paint, and the water retention property of the paper is adequate for assisting the base to resist weathering.

The type of asbestos fiber employed in this invention is not limited to any particular grade, since relatively long fibers, normally not adapted for use in the manufacture of paper, can be refined to such an extent that the resulting fiber lengths are suitable for paper manufacture. It is preferred that relatively short fibers be used, however, in order to reduce the refining time. Asbestos of grades 5 or 6, as measured according to the classification of the Quebec Asbestos Manufacturers Association, has been found to perform well.

It has been found that if the asbestos paper is made with a water insoluble binder material, in order to increase the wet strength of the paper, it is well suited for withstanding the weathering to which it would be exposed in an exterior installation. Similarly, if the adhesive for adhering the paper to plywood is water insoluble, the paper will not delaminate when wet. Further, neither the binder nor the adhesive should be able to support combustion, that is, while they may be capable of being decomposed by fire, they should not themselves promote flame spread. Examples of suitable binder materials are polyvinyl chloride, vinyl chloride, and vinylidene chloride. It is preferred that binder material of this type should be present in amounts by weight of the total materials in the paper of at least about 4% in order to provide adequate strength. Greater amounts can be used if desired, but for purposes of reducing costs it is preferred to utilize about 4% binder. An example of a suitable adhesive for use in the laminate of this invention is a vinyl modified phenolic thermosetting glue manufactured by the National Starch Company under the name of "Duro-Lok."

Paper manufactured according to these requirements has the ability to retain moisture in the ranges of 40%–60% of the weight of the paper. As a practical matter, when such paper is applied to a base sheet as an overlay, the paper will retain only about one-half of this amount. Even though asbestos paper is porous and cannot prevent water from passing through to the plywood when exposed to moisture in relatively large quantities, it has been found, surprisingly, that the veneer layer directly beneath the asbestos paper does not tend to crack as it would if it were uncovered. It is this phenomenon, in combination with the fire resistance of the laminate, that permits asbestos paper to be used as the overlay material. While the use of a water insoluble glue to adhere the asbestos paper to the plywood may be helpful in preventing a certain amount of moisture from reaching the veneer layer, the glue is not sufficient to prevent all the moisture from reaching the wood. The success of the asbestos paper in preventing cracking of plywood is probably due to a combination of factors, including the moisture retention properties of the paper and the ability of such paper to restrict the movement of the plywood to amounts within the capability of the asbestos paper to follow.

Use of asbestos paper also aids significantly in increasing the fire resistance properties of plywood. While it is well known that asbestos fibers in themselves are often used in the manufacture of various incombustible materials, the fire resistance provided by the asbestos paper laminate is not due merely to placing an incombustible barrier over the surface of the plywood. As pointed out above, the asbestos paper is porous and thus is not a solid barrier to fire. Heat from the fire can easily penetrate the asbestos paper and reach the plywood layer beneath. Moreover, even though the preferred binder material and the preferred glue may be capable of being decomposed by fire, nevertheless, the layer of asbestos paper does increase the fire resistance of the plywood. When a burning brand comes into contact with the asbestos paper overlay, the heat from the flame passes through the paper and raises the temperature of the plywood beneath. The tendency of the plywood to ignite, howevver, is reduced substantially, perhaps because the asbestos paper, even though thin and porous, may act somewhat as an insulation layer and prevent the flame to some extent from coming into actual contact with the plywood. Whatever the actual reason it takes a much longer time for the plywood of the laminate to be heated to its ignition temperature than if the asbestos paper were not present.

The following example illustrates the resistance to weathering and fire afforded by the laminate of the present invention.

A ⅜ inch thick plywood sheet having Douglas fir veneers of grades A-C exterior type was bonded to 10 mil thick asbestos paper weighing four pounds per hundred square feet and having a Gurley densometer reading, for 100 cc. of air to pass through the thickness of the paper, of 250 seconds. Glue manufactured by the National Starch Company under the name of "Duro-Lok" was applied to the asbestos paper at a rate of about 11 lbs. per thousand square feet of glue line. The paper was then applied to the C-face or the rougher face, of the plywood sheet. By applying the adhesive to the paper only, a substantial savings was effected because the paper did not absorb the glue as much as the plywood surface would have.

Three test specimens of such a laminate, each six inches by ten inches by ⅜ inch, and three test specimens of the same size but of plywood alone were subjected to six complete cycles of the ASTM C–481–62 Accelerated Aging Test, Cycle A. Each cycle of this test consists of immersing the specimens in water at 120° F., plus or minus 3° F. for one hour. The specimens are then sprayed with steam and water vapor at a temperature of 200° F., plus or minus 5° F., for a period of three hours, after which they are stored at 10° F., plus or minus 5° F., for twenty hours. The specimens are then heated at 210° F., plus or minus 3° F., in dry air for three hours and then sprayed again with steam and water vapor at 200° F., plus or minus 5° F., for three hours. Thereafter the specimens are heated in dry air at a temperature of 210° F., plus or minus 3° F., for a period of 18 hours. Each of these steps is carried out immediately following each other, allowing for a short inspection time of about 15 minutes, perhaps, of the samples after each step.

According to the foregoing tests, both sides of the plywood-asbestos paper laminate are exposed to the moisture and, accordingly, there is much more opportunity for moisture to reach the veneer layer covered by the asbestos paper than there would be if such a laminate were applied to a building structure. In that event, only the asbestos covered surface would be exposed to the weather. Even under the extremely adverse conditions imposed by the test, the surface of the plywood covered by the asbestos paper did not crack and move to an extent which affected the asbestos paper. The specimens of plain plywood, however, cracked markedly on the veneer surfaces and would have been unsuitable for exterior use. The side of the specimens opposite the sides covered by the asbestos paper also cracked markedly in the same manner as the plain plywood specimens. The relatively rough surface of the plywood veneer still did not show through the asbestos paper covering, and the asbestos paper presented a smooth surface which had the same appearance as it had prior to the test.

To test the relative fire resistances of plain plywood and plywood laminated on one face with asbestos paper, test panels of both types were subjected to a burning brand test similar to ASTM E–108–Class C. For this test, brands were slightly larger than the standard "C" brand which is used in the class C or method C phase of ASTM E–108, and were made from Douglas fir strips, each 9/16 inch by 9/16 inch by 3 inches, placed in three layers of four strips each, each strip being spaced one-quarter inch from the adjacent strip. The strips in each layer were placed at right angles to those in adjoining layers and finishing nails were used to secure the strips together. The brands were dried for one hour at 175° F. and then were ignited with the ASTM recommended gas burner, using a 25 second exposure on each side of the brand. The brands, which weighed 100 grams each, were placed on the surface of a plain piece of plywood and on the surface of plywood covered with asbestos paper, and were secured to the samples with wire. A 12 mile per hour wind was directed toward the samples. Both brands burned readily and after four minutes had elapsed, the uncovered plywood failed, that is, flame appeared on the under side of the board. Shortly before five minutes had elapsed, the unprotected plywood burst into flame and continued to burn and smolder until more than eleven minutes had elapsed. Although the asbestos paper of the laminate sample permitted slight charring of the plywood beneath it, the wood at no time ignited and the laminate sample passed the burning brand test.

The ASTM E–84–61 Tunnel Spread Flame Test was also run on samples of plywood and plywood covered with asbestos paper. In this test, a sample, 25 feet in length, is supported in a tunnel and a gas flame 4½ feet long is shot through the tunnel against the sample. The tunnel spread flame test results, which are recorded in units corresponding to the performance of the sample as compared to a sample of red oak, revealed that the plywood alone had a flame spread rating of 140, based on a rating of 100 for red oak, while the paper and plywood laminate had a rating of 110. The tunnel flame spread improvement obtained by the use of the asbestos paper, therefore, was more than 20%.

Referring now to the drawing, FIG. 1 illustrates a laminate 10 comprised of a sheet of plywood 12 covered on one surface with an asbestos paper 14 of the type described above. As shown in FIG. 1, the surface of the asbestos paper is smooth and does not reveal any rough characteristics or the grain of the plywood veneer beneath it.

FIG. 2 illustrates how plywood looks after it has been exposed to weathering of the type employed in carrying out the ASTM Accelerated Aging Test. It will be noted that the plywood veneer 16 has a number of cracks and splits 18 occurring in the surface. These cracks run substantially parallel to the grain of the wood and occur along the checks or lines of weakness in the wood.

The laminate illustrated in FIG. 3 reveals the difference made by employing the asbestos paper described above over one surface of the plywood sheet. In this figure, the sheet of plywood 20, the core of which is formed of three layers of wood sheets 22, has a wood veneer 24 on the back surface thereof and another wood veneer layer 26 on the surface intended to be the exterior surface. A layer of asbestos paper 28 is laminated to the exterior surface of the veneer layer 26 by means of an adhesive, not illustrated. After being subjected to the full six cycles of the ASTM Accelerated Aging Test, the wood veneer layer 24, which was not covered by asbestos paper, formed cracks 30, some of which, as illustrated, extended completely through the layer 24 to the sheets 22 of the core. The veneer layer 26 covered by the asbestos paper, on the other hand, did not crack and did not tend to deform in a manner which would show through the asbestos paper. As indicated above, this was unexpected since the asbestos paper did not prevent water from coming into contact with the veneer layer 26.

As a further example of the unusual properties of a laminate formed of a cellulosic base sheet and asbestos paper, samples of asbestos paper bonded to lumber were fabricated and tested. The material used was D-grade yellow pine covered on one side with asbestos paper adhered by adhesive manufactured by the National Starch Company under the name of "Duro-Lok." Samples 7½ inches by 18 inches and employing asbestos paper 18 mils and 30 mils in thickness were made up and subjected to a slightly modified arrangement of the ASTM C–481–62 Accelerated Aging Test, Cycle B, which provides an excellent indication of the practical weathering characteristics of the samples. The asbestos paper had a porosity in excess of that which would cause a reading on the Gurley densometer of more than 200 seconds for 100 cc. of air to pass through.

Each cycle consisted of immersing the specimens in water at 120° F., plus or minus 3° F., for one hour, spraying them with hot water at 160° F., plus or minus 5° F., for three hours, and storing them for twenty hours at −25° F., plus or minus 5° F. The cycle was continued by heating the specimens in dry air at 160° F., plus or minus 5° F., for three hours, spraying them again with hot water at 160° F., plus or minus 5° F., and then heating them in dry air at 160° F., plus or minus 5° F., for eighteen hours. The specimens were subjected to six such cycles and even after this rigorous exposure to continuous extremely adverse conditions, the asbestos paper was found to be intact and unaffected by movement of the wood.

A sheet of cellulosic material covered on one surface with asbestos paper can be utilized as an exterior siding panel in the usual manner. As illustrated in FIG. 4, panels 31, comprised of asbestos covered plywood, can be attached to the building structure 32 by an suitable fastening means, such as nails. The abutting edges of adjacent panels can be covered with batten board strips 33 to provide a neat finish. If desired, the batten strips may also comprise wooden boards covered with asbestos paper.

The laminate of the present invention may be made in any desirable manner, including lamination by hand. A simple typical laminating procedure, however, adapted for use in a commercial operation is illustrated in FIG. 5, wherein asbestos paper 34 is drawn from a drum 35 around guide rolls 36 and 38 in the direction of the conveyor 40. The conveyor 40 supports a plywood or other sheet 42 and moves continuously in the direction of the arrow. At the guide roll 38, the lowermost surface of the asbestos paper is contacted by the roll 44 which transfers adhesive from the receptacle 46 to the paper. The paper continues downwardly toward the conveyor 40 and is directed toward the upper surface of the plywood 42 by means of the guide roll 48. The laminate then passes between pressing rolls 50, 50, which cause the paper to be intimately adhered to the plywood, and beneath the heater 54, which cures and sets the adhesive.

It should now be apparent that the present invention permits the use of a relatively inexpensive and common material, asbestos paper, as an overlay for the exterior surface of a cellulosic sheet. The unexpected results described above indicate that when asbestos paper is used to cover the surface of the base sheet, the excellent weathering characteristics and the fire resistance displayed by the laminate permit its use in exterior installations. The asbestos paper may be decorated in any desired manner, including embossed designs on the paper.

It is to be understood that variations and modifications of the present invention may be made without departing from the spirit of the invention. It also is to be understood that the scope of the invention is not to be interpreted as limited to the specific embodiment disclosed herein, but only in accordance with the appended claims, when read in the light of the foregoing disclosure.

What I claim is:
1. A laminate for use as a building material, comprising
    (a) a sheet of cellulosis material, and
    (b) an overlay comprising asbestos paper adhered to a surface of the cellulosic sheet,
    (c) the asbestos paper containing water insoluble binder material dispersed therethrough to increase the wet strength of the paper.
2. A laminate as recited in claim 1, wherein the cellulosic sheet is plywood.
3. A laminate for use as a building material, comprising
    (a) a sheet of wood,
    (b) asbestos paper adhered to a surface of the wood,
    (c) the asbestos paper weighing at least about 4 pounds per 100 square feet and having a porosity such that the time for 100 cc. of air to pass through the thickness of the paper, as measured by TAPPI Test T-460 M49, is at least about 200 seconds,
    (d) the asbestos paper containing water insoluble binder material dispersed therethrough to increase the wet strength of the paper.
4. A laminate as recited in claim 3, wherein the asbestos paper is adhered to the wood by water insoluble adhesive, both the adhesive and the binder having the property of not supporting combustion.
5. A laminate as recited in claim 3, wherein the asbestos paper is at least ten mils thick.
6. A laminate as recited in claim 3, wherein the binder material is present in amounts of at least 4% of the total weight of the asbestos paper.
7. A laminate for use as a building material, comprising
    (a) a sheet of plywood,
    (b) a sheet of asbestos paper adhered to a major surface of the plywood sheet by water insoluble adhesive,
    (c) the asbestos paper weighing at least 4 pounds per hundred square feet and having a porosity such that the time for 100 cc. of air to pass through the thickness of the paper, as measured by TAPPI Test T-460 M49, is at least 200 seconds, and
    (d) the paper containing at least about 4%, by weight, of water insoluble vinyl resin as a binder material dispersed therethrough to increase the wet strength of the paper.
8. In a building construction an exterior element attached to the construction, comprising
    (a) a building material laminate,
    (b) the laminate comprising
        (1) a cellulosic sheet
        (2) asbestos paper adhered to the exterior surface of the sheet, and
        (3) the paper containing water insoluble binder material dispersed therethrough to increase the wet strength of the paper.
9. A building construction element as recited in claim 8, wherein the asbestos paper is adhered to the cellulosic sheet by means of a thermosetting modified vinyl phenolic adhesive.
10. A building construction element as recited in claim 8, wherein the binder material in the asbestos paper comprises a vinyl resin present in amount, by weight, of at least 4% of the total weight of the asbestos paper.
11. A building construction element as recited in claim 8, wherein the cellulosic sheet is plywood.
12. A building construction element as recited in claim 8, wherein the asbestos paper weighs at least about 4 pounds per 100 square feet and has a porosity as measured by TAPPI Test T-460 M49, such that 100 cc. of air takes at least 200 seconds to pass through the thickness of the paper.

References Cited

UNITED STATES PATENTS

| | | | |
|---|---|---|---|
| 1,987,506 | 1/1935 | Fitzpatrick | 161—205 |
| 2,593,708 | 4/1952 | Ware et al. | 156—324 X |
| 3,300,927 | 1/1967 | Bettoli | 161—205 X |

EARL M. BERGERT, *Primary Examiner.*

T. R. SAVOIE, *Assistant Examiner.*

U.S. Cl. X.R.

161—270, 403